Sept. 28, 1965 J. C. HOLLAND 3,208,764
STEERING ARRANGEMENT FOR SELF-PROPELLED CART
Filed Aug. 19, 1963 2 Sheets-Sheet 1
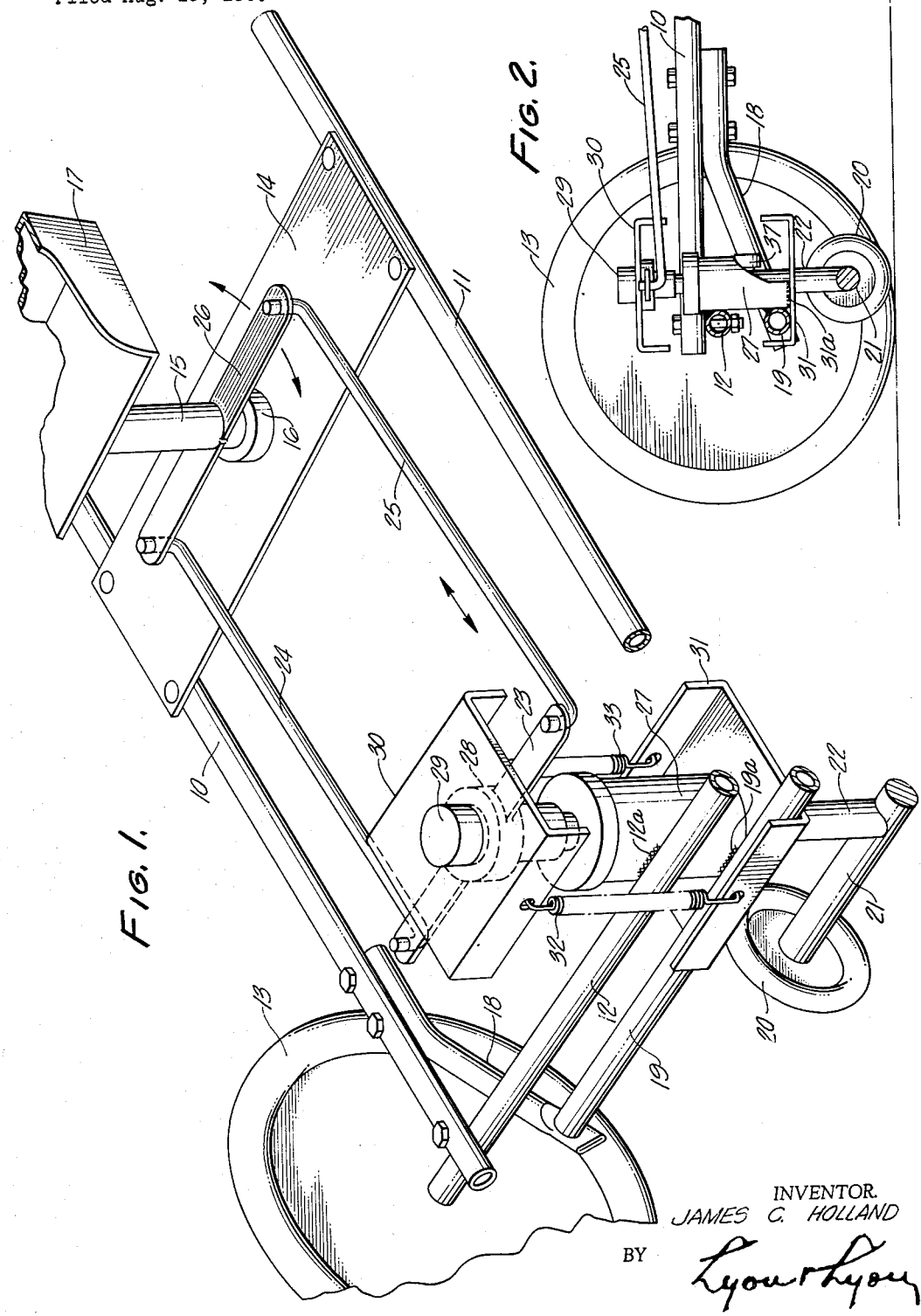
INVENTOR.
JAMES C. HOLLAND
BY
*Lyon + Lyon*
ATTORNEYS Sept. 28, 1965 J. C. HOLLAND 3,208,764
STEERING ARRANGEMENT FOR SELF-PROPELLED CART
Filed Aug. 19, 1963 2 Sheets-Sheet 2

INVENTOR.
JAMES C. HOLLAND
BY Lyon & Lyon
ATTORNEYS

United States Patent Office 3,208,764
Patented Sept. 28, 1965

3,208,764
STEERING ARRANGEMENT FOR SELF-PROPELLED CART
James C. Holland, 12722 Avalon Blvd., Los Angeles, Calif.
Filed Aug. 19, 1963, Ser. No. 302,803
4 Claims. (Cl. 280—87)

This invention relates to a four-wheeled cart and more particularly, to a novel steering arrangement whereby the vehicle is steered by twisting the body of the user in a rotatable seat. It is, therefore, an object of this invention, to provide a cart of the type described in which steering is accomplished without the use of the hands of the user.

The invention is characterized by the fact that the front wheels are in two pairs, an outer main supporting wheels and an inner smaller pair of wheels which are used for steering purposes only. When the device is used so as to rotate the seat two things happen, the larger outer front wheels are lifted clear off the ground while the smaller, steering wheels are brought in supporting contact with the ground and are turned in either direction by the twisting of the body. It is only when the device is going in a straight line that the outer wheels are in load-supporting position.

These and other objects, features and advantages will be apparent from the annexed specification in which:

FIGURE 1 is a perspective elevation with parts broken away for clarity of illustration.

FIGURE 2 is a view looking towards the inner side of one of the wheels and showing the central post detail.

Figure 3:
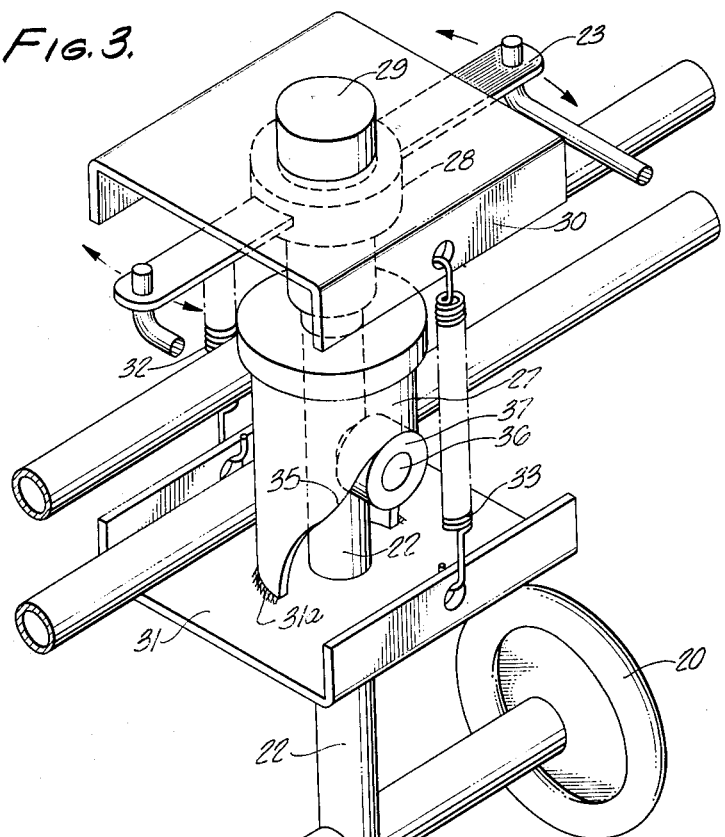
FIGURE 3 is an enlarged, perspective elevation of the central post small front wheels and associated mechanism.

Referring now more particularly to the drawings there is shown a cart having a frame work composed of side rods 10 and 11 and front cross rod 12 on which are rotatively mounted a pair of wheels 13 only one of which is shown in FIGURE 1. A cross plate 14 is mounted between the rods 10 and 11 and a post 15 is rotatively mounted in a bearing 16 carried by the plate 14; the post 15 mounts a seat 17. Adjacent the front end of the chart each of side rods 10 and 11 has secured thereto a depending rod 18 and between the two depending rods 18 there is affixed a cross rod 19. A pair of small steering wheels 20 are connected together by a cross rod 21 which carries an upstanding post 22. At its upper end the post 22 carries a cross extending plate 23 adjacent the ends of which are pivotally connected rods 24 and 25. A plate 26 is affixed to the post 15 and the rear ends of rods 24 and 25 are rotatively connected to plate 26. A barrel 27 is provided, through which post 22 extends and which is welded to rods 12 and 19 as at 12A and 19A. Post 22 carries a collar 28 secured thereto by a nut 29. Mounted between the nut 29 and the collar 28 is an angle piece 30 and also connected to the collar 28 is the cross plate 23. An upwardly facing angle plate 31 is provided through which post 22 extends in relatively movable contact and barrel 27 is welded to plate 31 as at 31A. Angles 30 and 31 are connected together by a pair of tension springs 32 and 33.

Figure 4:
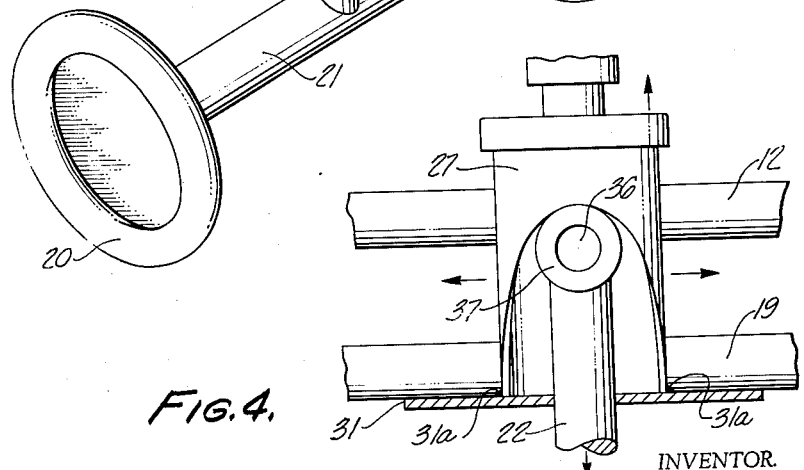
FIGURE 4 is a view looking forward at the large central post.

As is most clearly shown in FIGURES 2, 3 and 4 the barrel 27 adjacent its rear edge is cut away to provide a cam face 35. Mounted upon a pin 36 carried by the post 22 is a cam follower 37. In FIGURES 2, 3 and 4 the cam follower 37 is shown in this extremely high position which is the position for straight ahead movement of the cart.

Any turning of the blade 23 by pivoting of the seat 17 will cause the cam follower 37 to move to the right or the left, FIGURE 3, and thus cause the post 22 to move downwardly to engage the steering wheels 20 with the ground. At the same time rods 12 and 19, welded to angle plate 31, cause the wheels 13 to be raised from the ground. Simultaneously with the lowering of the wheels 20 to load supporting position, they have been turned in the desired direction. It will thus be seen that the turning of the vehicle of this cart is accomplished entirely by the twisting of the operator in the seat 15.

While there has been described what is at present considered the preferred embodiment of the present invention it will be appreciated by those skilled in the art that various changes and modifications can be made therein without departing from the essence of the invention and it is intended to cover all such changes or modifications as come within the true spirit and scope of the appended claims.

I claim:

1. In a wheeled vehicle, the combination of: a frame; a seat pivotally mounted on said frame; a first pair of front wheels mounted in spaced relation and supporting said frame when it is being driven in a straight path, the longitudinal center plane of said wheels being fixed relative to said frame and extending parallel to the longitudinal central axis thereof; a second pair of spaced wheels pivotally mounted relative to said frame and mounted for vertical movement with respect thereto, said second pair of wheels being positioned between said first pair of wheels and being adapted to support said frame during turning only; and means interconnecting said second pair of wheels and said seat for simultaneously lowering and turning said second pair of wheels upon pivotal movement of said seat, said means also interconnecting said first pair of wheels and said seat for simultaneously raising said first pair of wheels upon pivotal movement of said seat from its straight-ahead position, said first and second pairs of wheels being returned to their original position by movement of said seat back to its straight-ahead position.

2. A combination as set forth in claim 1 in which said second pair of wheels are connected to an upstanding post rotatably mounted on said frame and said upstanding post is connected to said seat to turn with said pivotal movement of said seat.

3. A combination as set forth in claim 2 in which said upstanding post is surrounded by a barrel fixedly mounted on said frame having an open cam face therein and said post carries a cam follower adapted to raise and lower said post on turning of said post.

4. A combination as set forth in claim 3 in which said barrel is connected to said first pair of wheels whereby on lowering of said post the first pair of wheels is raised.

References Cited by the Examiner

UNITED STATES PATENTS

| | | | |
|---|---|---|---|
| 670,405 | 3/01 | Hunter | 280—81.5 X |
| 1,512,755 | 10/24 | Galbraith | 280—43.20 X |
| 2,735,130 | 2/56 | Unsworth. | |
| 2,737,682 | 3/56 | Holtz | 280—43.2 X |

FOREIGN PATENTS

| | | |
|---|---|---|
| 10,546 | 1900 | Great Britain. |
| 287,231 | 3/28 | Great Britain. |

MILTON BUCHLER, *Primary Examiner.*

KENNETH H. BETTS, A. HARRY LEVY, *Examiners.*